United States Patent [19]
Bein et al.

[11] Patent Number: 4,703,315
[45] Date of Patent: Oct. 27, 1987

[54] LEVEL INDICATING DEVICE

[76] Inventors: David H. Bein; Raymond E. Bein, both of 1841 Beechwood Rd., #7, Charleston, S.C. 29407

[21] Appl. No.: 829,964

[22] Filed: Feb. 18, 1986

[51] Int. Cl.$^4$ ................................................ G01C 9/06
[52] U.S. Cl. ...................................... 340/689; 33/366
[58] Field of Search ...................... 33/363 L, 366, 349, 33/312, 313, 308; 340/689

[56] References Cited

U.S. PATENT DOCUMENTS

| | | | |
|---|---|---|---|
| 3,791,042 | 2/1974 | Bell | 33/366 |
| 4,253,242 | 3/1981 | McIverney | 33/366 |
| 4,557,056 | 12/1985 | Kim et al. | 33/366 |
| 4,565,010 | 1/1986 | Herman | 340/689 |

FOREIGN PATENT DOCUMENTS 1138647 2/1985 U.S.S.R. .................................. 33/366

*Primary Examiner*—Howard A. Birmiel
*Attorney, Agent, or Firm*—Dority & Manning

[57] ABSTRACT

A level for emitting an audio-visual signal to indicate when the level attains a vertical or an horizontal condition includes an electric power supply, an electric buzzer, an electric light emitting device, a first printed circuit board having a ring of electrically conductive material thereon, a second printed circuit board having an electrically conductive cross pattern printed thereon, and a pendulum having an electrically conducting resilient biasing member to maintain contact between the first and second boards.

8 Claims, 4 Drawing Figures

LEVEL INDICATING DEVICE

BACKGROUND OF THE INVENTION

The present invention relates to a level indicating device and specifically to a level which emits an audio signal and a visual signal when the desired level condition is attained by the device.

There are many instances where a solitary workman needs to adjust a workpiece to a level condition from a site remote from the place where the level condition is desired. In other instances, the level must be placed at a site that is not accessible to a person, and thus the observer of the level must remain at a location remote from the level's location. Moreover, the lighting conditions at the workplace are not always ideal for reading a conventional gas bubble type level. In such circumstances, a level indicating device which emits an audible signal or a visual signal upon attaining a level condition enables the workman to make the adjustment without requiring the presence of a second workman at the site where the level indicating device is placed to read when the level condition has been attained.

In U.S. Pat. No. 723,526 to Hein, a leveling staff has a pendulum which forms a complete electric circuit with an incandescent lamp and an electric bell when the pendulum is parallel to the longitudinal axis of the staff. U.S. Pat. No. 3,233,235 to Wright discloses a signaling level having a pendulum which magnetically activates a switch that closes a circuit and lights a light or sounds a buzzer when the level rests in an horizontal position. The pendulum is mounted on a rotatable, angularly adjustable dial which must be rotated depending upon whether the level is required to sense a vertical or an horizontal condition.

In some applications, it is desirable to have a level sensing device which is capable of sensing both an horizontal and a vertical condition either simultaneously or consecutively without any intervening adjustment of the device between sensing the vertical condition and sensing the horizontal condition.

OBJECTS AND SUMMARY OF THE INVENTION

It therefore is a principal object of the present invention to provide a device capable of detecting a truly horizontal or truly vertical condition and indicating same to a remote interested party, consecutively and without repositioning the device or resetting the device.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the level indicating device of this invention comprises: a housing having at least one planar surface thereon; a source of electrical power received within the housing; a first, electrically conductive member received with the housing and in electrical communication with the source of power; a second member received within the housing in spaced apart relation to the first member, the second member having an electrically conductive surface on predetermined portions thereof only; a pendulum disposed between the first and second members, the pendulum having electrical contact means on opposite sides of same with electrical connections therebetween, the contact means on one side of the pendulum making continuous contact with the first electrically conductive member; electrical signal means associated with the source of power, the first member and the electrically conductive surface portions of the second member; the electrical contact means in the opposite side of the pendulum making contact with one of the electrically conductive surface portions of the second member only when the housing is disposed to cause gravitational forces in the pendulum to locate the opposite side contact means at the predetermined electrically conducting surface portion of the second member; and whereby when the housing is disposed to cause gravitational forces on the pendulum to locate the opposite side contact means of the pendulum at the electrically conductive surface of the second member, the electrical signal means, the source of electrical power, the first member, the electrical contact means of the pendulum, and the electrically conductive surface of the second member are electrically connected to activate the signal means.

The device of the present invention is not limited to detecting just a vertical position or just a horizontal position. It does not need to be manually preset before it can detect a vertical condition as opposed to a horizontal condition. Rather, the device is always capable of detecting a predetermined orientation of the device relative to the direction of the force of gravity on the device, without being preset to detect specifically one or the other.

The electrical signal means of the invention can include both audible signaling means and visible signaling means. An electric buzzer constitutes one example of suitable audible signaling means, and a light emitting diode (LED) or an incandescent lamp constitute examples of suitable visible signaling means.

One embodiment of the first, electrically conductive member includes a printed semiconductor circuit board having a ring of conductive material formed on a planar surface thereof. Similarly, an example of the second member, which is received within the housing in spaced apart relation to the first member, is a semiconductor printed circuit board having a pattern of predetermined geometry of conductive material formed on a planar surface thereof. The predetermined geometry can include linear projections with adjacent ones of these linear projections extending relative to one another at any desired predetermined angle, such as 30°, 45° or 90°.

An embodiment of the electrical contact means comprises a resilient biasing means formed of electrically conducting material, a continuous contact member electrically contacting the biasing means and the continuous conductive ring of the first printed circuit board, an intermittent contact member electrically communicating with the biasing means and physically contacting the second printed circuit board. The biasing means maintains continuous contact between the first member and the first board and between the second member and the second board as the pendulum swings in the space between the two boards, and accordingly, electrical communication is established between the second member and one of the linear projections comprising the geometrical pattern on the second board as the level is supported for example in one of horizontal and vertical positions.

A metal spring comprises one embodiment of the resilient biasing means.

One embodiment of the invention has an activation means, which includes a first printed circuit board having a ring of conductive material formed thereon, a second printed circuit board having a cross pattern of conductive material formed thereon, and a pendulum having contact means for electrically connecting the ring of the first board with the cross pattern of the second board. The pendulum is rotatably mounted between the first and second printed circuit boards and is free to swing 360° in a circle.

The accompanying drawings, which are incorporated in and constitute a part of this specification, illustrate one embodiment of the invention and, together with the description, serve to explain the principles of the invention.

DESCRIPTION OF THE PREFERRED EMBODIMENTS

Reference will now be made in detail to the present preferred embodiment of the invention, an example of which is illustrated in the accompanying drawings.

Figure 1:
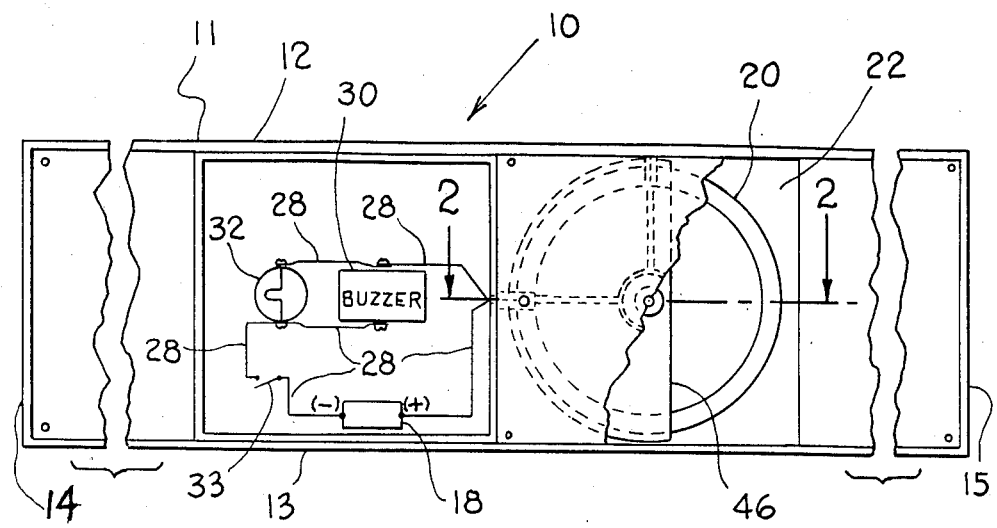
FIG. 1 is a front plan view, with cut-away and phantom portions, of an embodiment of the present invention.

The present invention is a level indicating device that indicates to a remote interested party, when the device has attained a predetermined angular orientation relative to the direction of the force of gravity, and preferably a vertical or a horizontal orientation. The invention comprises a housing, an electric power supply, audible signaling means, visible signaling means, and means for electrically connecting the power supply, the audible signaling means and the visible signaling means when the level attains one of vertical and horizontal positions. One embodiment of the present invention is depicted in FIG. 1 and is generally designated by the numeral 10.

Figure 2:
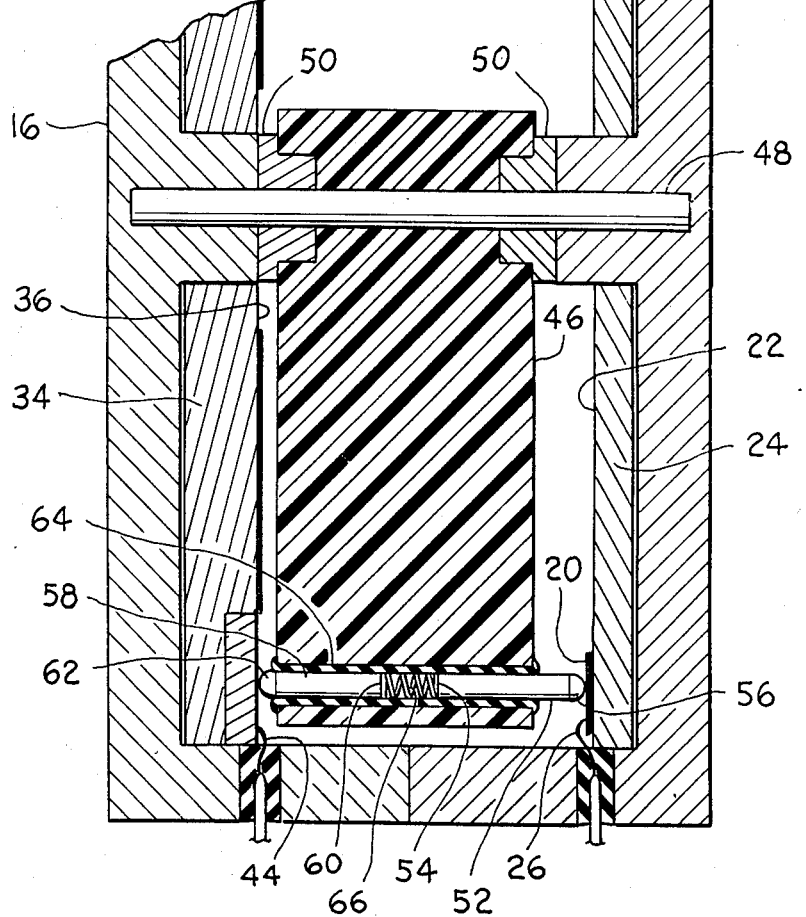
FIG. 2 is a cross-sectional view taken along the line indicated by the numerals 2—2 of FIG. 1.

One embodiment of the device of the present invention includes a housing 11 which may be formed in the shape of a rectangular box having six planar sides, including a pair of horizontal sides 12, 13, a pair of vertical sides 14, 15, a front end 16 and a back end 17 (FIG. 2). As shown in FIG. 1 for example, horizontal sides 12, 13 are oriented at a predetermined angle of 90° relative to vertical sides 14, 15. However, other shapes can be formed to provide planar surfaces oriented relative to one another at an angle other than 90°. For example, two planar surfaces can be oriented at an angle of 45°, 30°, etc. In this way, the device of the present invention can be used to indicate different angular orientations relative to the direction of the force of gravity on the pendulum (to be described below). The housing can be formed of any suitable material, such as wood, sheet metal, plastic, etc., and can be made water proof and dust proof by the application of appropriate sealing substances or structures.

The source electrical power of the present invention can comprise a portable direct current electric power supply, such as is furnished by a battery 18. The voltage output requirement of the battery will depend upon the requirements of the devices used to provide the audible and visible signals of the device. However, a 9-volt battery normally used to power portable radios and cassette tape players is generally deemed adequate for purposes of the present invention.

In accordance with the present invention, a first, electrically conductive member is provided to be received within the housing and in electrical communication with the source of electrical power. As embodied herein and shown for example in phantom in FIG. 3, in a front partial plan view in FIG. 1, and in a cross-sectional view in FIG. 2, the first member comprises a ring 20 of electrically conductive material, such as copper or other metal, formed on a substantially planar surface 22 of a main body of a first printed circuit board 24, which may be formed of an insulating material or of a semiconductor material. Ring 20 need not be substantially planar, but could have a definite contour. Circuit board 24 is formed with an opening therethrough in the central region thereof, and ring 20 of conductive material can be deposited thereon by any of the methods familiar to those who manufacture semiconductor electronic devices. First printed circuit board 24 is mounted within housing 11 as by screws, glue or other fastening means. As shown particularly in FIG. 2, a lead wire 26 electrically connects conductive ring 20 of first printed circuit board 24 to the electrical circuit comprising a plurality of wires 28, the power supply, an electric buzzer 30, an incandescent lamp 32, and an on/off switch 33.

Figure 3:
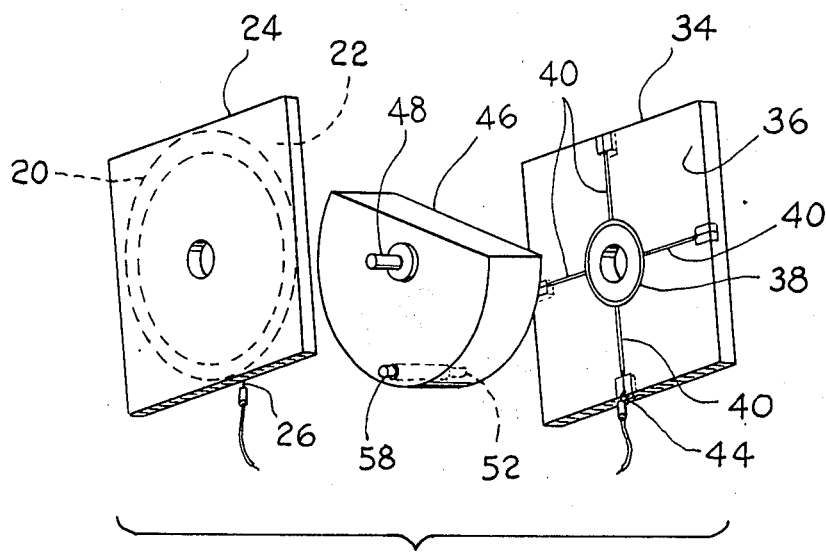
FIG. 3 is a perspective exploded view of components of an embodiment of the present invention.

In further accordance with the present invention, a second member is provided to be received within the housing in spaced apart relation to the first member. An electrically conductive surface is provided on predetermined portions only of the second member in accordance with the invention. As embodied herein and shown in FIG. 3 in exploded view, FIG. 1 in phantom view, and FIG. 2 in a cross-sectional view, the second member comprises a second printed circuit board 34 which has a substantially planar surface 36. A continuous, electrically conductive, geometrical pattern 38 is formed of conductive material, such as copper or aluminum, on surface 36. In the embodiment shown in FIG. 3, there are a plurality of electrically conductive peripheral portions 40 forming part of the continuous pattern which is deposited on second board 34 in a manner familiar to those skilled in the production of electronic semiconductor devices. The pattern of electrically conductive material formed on second board 34 can have a generally cross-shaped appearance of four radially extending linear projective portions 40, which are oriented at 90° intervals between adjacent projective portions 40, as shown in FIG. 3. Circuit board 34 is formed with an opening therethrough in the central region thereof. The central portion of pattern 38 comprises a circular ring of conductive material surrounding the opening, and from which each of the four linear projective portions extend radially outwardly toward the peripheral edge of the main body of second circuit board 34.

Continuous pattern 38 also can be formed with adjacent linear projective portions 40 oriented at angles other than 90°, such as at angles of 30°, 45°, etc. Second board 34 is mounted inside housing 11 as by screws, glue or other fastening means. The orientation of any of electrically conductive surface portions 40 can be predetermined relative to the orientation of one of the planar surfaces of housing 11. As will become clear from the description which follows, in accordance with such predetermined relative orientation of a planar housing surface and an electrically conductive surface portion of the second member, the device of the present invention can be made to indicate when the device is resting at an angle of 90°, or an angle other than 90°, from the direction along which the gravitational force acts on the pendulum (described below) of the device.

Figure 4:
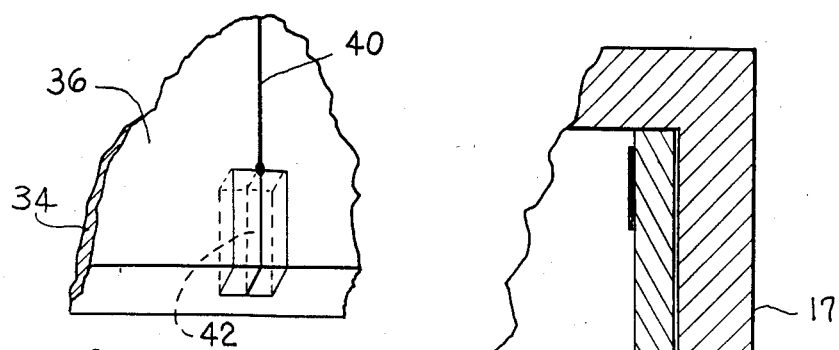
FIG. 4 is an expanded partial view of a component of an embodiment of the present invention.

The portion of each electrically conductive portion 40 of pattern 38 of second circuit board 34 nearest the peripheral edge of board 34 is shown in expanded detail in FIG. 4. This end section of each electrically conductive portion comprises a razor thin foil 42 of electrically conductive material which connects to each portion 40 at the end thereof nearest the peripheral edge of board 34. Foil 42 is sandwiched between two layers of semi-conductive substrate, or other nonconductive material, and inserted into second board 34 as shown in FIG. 4, and honed and polished smooth with planar surface 36 of board 34. These end sections of portions 40 provide very precise points of electrical contact due to the very narrowly defined regions occupied by foils 42.

As shown in particular in FIGS. 2 and 3, one of the four razor thin foils 42 is electrically connected to an electrical lead wire 44, which forms part of an electrical circuit with wires 28, the power supply, buzzer 30, and lamp 32. Lead wire 44 electrically connects conductive pattern 38 of second printed circuit board 34, including each of razor thin foil sections 42 at the extreme ends of each of four projective portions 40, to the circuit elements comprising the power supply, the audible signaling means, and the visible signaling means.

The device of the present invention also includes a pendulum disposed between the first and second members and having electrical contact means on opposite sides of the pendulum. As embodied herein, a pendulum 46 is mounted as shown in FIG. 2 about a cylindrical shaft 48, which has each end anchored in watertight and dustproof housing 11 of the device. Shaft 48 extends through pendulum 46, and a pair of bearings 50 pivotally support pendulum 46, which rotates 360° in a circular path around shaft 48. Pendulum 46 is mounted to swing freely in the space that exists between first board 24 and second board 34. Each of planar surfaces 22, 36 of boards 24, 34, respectively, faces pendulum 46, which is preferably formed of any suitable dense material, such as lead. Moreover, the material forming pendulum 46 can be either electrically conducting or non-conducting as desired. However, if electrically conducting material is chosen, it becomes necessary to insulate the electrical contact means described below.

In further accordance with the present invention, the pendulum is provided with electrical contact means on opposite sides of the pendulum and with electrical connections therebetween. The invention also provides that the electrical contact means on one side of the pendulum makes continuous electrical contact with the first electrically conductive member and further that the electrical contact means on the opposite side of the pendulum makes electrical contact with the electrically conductive surface at one of the predetermined electrically conductive surface portions of the second member, only when the housing is disposed to cause gravitational forces acting on the pendulum to locate the opposite side contact means at one of the predetermined electrically conductive surface portions of the second member. As embodied herein and shown for example in FIGS. 2 and 3, the electrical contact means of the present invention includes a resilient biasing means formed of electrically conducting material. The electrical contact means further includes a continuous contact member 52 having an inner end 54 contacting one end of the biasing means and having an outer end 56 in continuous electrical communication with conductive ring 20 of first board 24. Continuous contact member 52 can be formed solely of an electrically conducting material, or of a non-conducting material surrounding an electrically conducting element which is connected to ends 54, 56, which are themselves formed of electrically conducting material. The electrical contact means still further includes an intermittent contact member 58 having an inner end 60 contacting the opposite end of the biasing means and having an outer end 62 physically contacting first planar surface 36 of second printed circuit board 34. Intermittent contact member 58 also can be formed of either electrically conducting material throughout or of non-conducting material surrounding an electrically conducting element connected to its ends 60, 62, which are themselves formed of electrically conducting material.

In the embodiment shown in cross-section in the view of FIG. 2, a cylindrical sleeve 64 formed of electrically insulating material surrounds the biasing means and continuous and intermittent contact members 52, 58, which are formed of electrically conducting material throughout. Inner and outer ends 54, 56 are integrally formed as part of continuous contact member 52, and inner and outer ends 60, 62 are integrally formed as part of intermittent contact member 58. Insulating sleeve 64 electrically insulates the biasing means and continuous and intermittent contact members 52, 58 from pendulum 46, which can be formed of a dense metallic material.

In still further accordance with the present invention, resilient biasing means formed of electrically conducting material is provided for maintaining continuous electrical communication between the continuous contact member and the first, electrically conductive member and for maintaining continuous physical contact between the intermittent contact member and the second member as the pendulum swings in the space between the first and second members and electrical communication is established between the intermittent contact member and one of the electrically conductive portions of the second member, as the device is supported for example in one of horizontal and vertical positions. As embodied herein and shown for example in FIG. 2, the resilient biasing means of the present invention preferably comprises a metallic spring 66, which is inserted between and electrically communicates with inner ends 54, 60, respectively, of continuous and intermittent contact members 52, 58.

In accordance with the present invention, electrical signal means are provided, such as audible signaling means or visible signaling means. For example, as shown in FIG. 1, an embodiment of the audible signaling means of the present invention comprises an electric buzzer 30 which emits a buzzing sound when an electric current flows therethrough.

A visible signaling means is provided in further accordance with the present invention. One embodiment of the visible signaling means of the present invention comprises an incandescent electric lamp 32, as shown for example in FIG. 1. A light emitting diode (LED) (not shown) also provides a suitable visible signaling means in accordance with the present invention.

In still further accordance with an embodiment of the present invention, activation means are provided for electrically connecting the electric power supply, the audible signaling means and the visible signaling means when the device attains one of vertical and horizontal positions. As embodied herein and shown for example in FIGS. 1-3, the activation means comprises a plurality of electric current carrying elements, such as wires 28, a pendulum 46 having an electrical contact means, a first printed circuit board 24, a second printed circuit board 34, and wherein the power supply, audible signaling means, visible signaling means, the contact means, first board 24 and second board 34 form a complete electrical circuit when the device of the present invention attains for example one of horizontal and vertical positions.

In operation, one of the exterior surfaces, such as horizontal surfaces 12, 13 or vertical surfaces 14, 15 of housing 11 is placed against a surface which the operator of device 10 desires to monitor. For example, the operator can place the device at one end of a plank while raising or lowering the opposite end of the same plank at a considerable distance to the end where the device is resting. Assuming for purposes of this discussion that a vertical surface 14 (FIG. 1) is the surface resting against this hypothetical plank, pendulum 46 is free to rotate as the gravitational force acts on pendulum 46 and orients same according to the orientation of pendulum 46 relative to the source of the gravitational attraction and vertical surface 14. As pendulum 46 rotates, continuous contact member 52 continuously electrically communicates with conductive ring 20 of first printed circuit board 24 while intermittent contact member 58 continuously physically contacts first planar surface 36 of second printed circuit board 34. However, second printed circuit board 34 is oriented relative to vertical surfaces 14, 15 and horizontal surfaces 12, 13 such that when either of the exterior vertical or horizontal surfaces of housing 11 rests against a level surface, one of four razor thin foil portions 42 of one of four linear projective portions 40 of conductive cross pattern 38 of second printed circuit board 34, becomes precisely aligned with outer end 62 of intermittent contact member 58 of the electrical contact means carried by pendulum 46. This precise condition is shown in each of FIGS. 1 and 2. When this condition has been attained, a complete electrical circuit is formed, assuming an on/off switch 33 is closed, between the power supply, buzzer 30, and lamp 32. The attainment of this condition activates buzzer 30 and lamp 32 to sound and light respectively, and accordingly indicates to the operator, who is located at a position remote from the device, that the desired level condition has been attained.

Moreover, the device of the present invention operates regardless of whether it is one of vertical exterior surfaces 14, 15 or horizontal exterior surfaces 12, 13, that is resting against the surface to be monitored by the operator. In other words, the device of the present invention is capable of indicating both a horizontal or a vertical condition of the device without requiring any adjustment of the device, such as the manual adjustment of the dial required of the device disclosed in Wright (U.S. Pat. No. 3,233,235) discussed above.

It will be apparent to those skilled in the art that various modifications and variations can be made in the level indicating device of the present invention, without departing from the scope or spirit of the invention. Thus, it is intended that the present invention cover the modifications and variations of this invention, provided they come within the scope of the appended claims and their equivalents.

What is claimed is:

1. A device for indicating to a remote interested party, when the device attains a predetermined orientation relative to the direction of the force of gravity on the device, comprising:

a housing having at least one planar surface thereon;
   a source of electrical power received within said housing;
   a first, electrically conductive member received within said housing and in electrical communication with said source of power;
   a second member received within said housing in spaced apart relation to said first member, said second member having an electrically conductive surface on predetermined portions only;
   a pendulum disposed between said first and second members, said pendulum having electrical contact means on opposite sides of same with electrical connections therebetween, said electrical contact means on one side of said pendulum making continuous electrical contact with said first electrically conductive member;
   electrical signal means associated with said source of electrical power, said first member and one of said electrically conductive surface portions of said second member;
   said electrical contact means on said opposite side of said pendulum electrically communicating with one of said electrically conductive surface portions of said second member only when said housing is disposed to cause gravitational forces acting on said pendulum to locate said opposite side contact means at said predetermined electrically conducting surface portion of said second member; and
   whereby when said housing is disposed to cause gravitational forces on said pendulum to locate said opposite side contact means of said pendulum at one of said electrically conductive surface portions of said second member, said electrical signal means, said source of electrical power, said first member, said electrical contact means of said pendulum, and said electrically conductive surface of said second member are electrically connected to activate said signal means.

2. A device as in claim 1, wherein:
   each of said first and second members includes a printed circuit board;
   said electrical signal means includes an audible signaling means and a visible signaling means;
   said power source, said audible signaling means, said visible signaling means, said contact means, said first and second members forming a complete electrical circuit when one of said planar surfaces of said housing attains said predetermined orientation relative to the direction of the force of gravity on the device.

3. A device for emitting audio-visual signals upon attaining a predetermined orientation relative to the direction of the force of gravity on the device, the device comprising:
   an electronic circuit including a power supply, an audible signaling means, a visible signaling means and an activation means;

said activation means including a first printed circuit board having a first planar surface and printed thereon around the periphery thereof a continuous ring of conductive material, a second printed circuit board having a first planar surface and printed thereon a continuous pattern of conductive material with at least two projections, adjacent ones of said projections being oriented relative to each other at a predetermined angle, and a pendulum having electrical contact means for electrically connecting said continuous ring and one of said projections to activate said audible signaling means and said visible signaling means when the device rests against a surface disposed at a predetermined orientation relative to the direction of the force of gravity.

4. An audio-visual signaling device as in claim 3, wherein:
said first and second boards are spaced apart from each other and said pendulum is mounted to swing freely and is disposed in the space between said first board and said second board, and each of said planar surfaces of said boards faces said pendulum.

5. An audio-visual signaling device as in claim 4, wherein:
said electrical contact means of said pendulum includes a resilient biasing means formed of electrically conducting material, a continuous contact member electrically communicating with said conductive ring of said first board and with said biasing means, an intermittent contact member electrically communicating with said biasing means and physically contacting said second board; and
whereby said biasing means maintains continuous contact between said continuous contact member and said first board and between said intermittent contact member and said second board as said pendulum swings in the space between said boards and electrical contact is established between said intermittent contact member and one of said projections of said second member as the device is supported at said predetermined orientation relative to the direction of the force of gravity on the device.

6. An audio-visual signaling device as in claim 5, wherein: each of said projection portions of said continuous pattern of conductive material printed on said second printed circuit board has at the peripheral edge thereof a razor thin foil portion of conducting material for providing precise electrical contact with said intermittent contact member when the device has attained one said predetermined orientation relative to the direction of the force of gravity on the device.

7. A device for indicating to a remote interested party, when the device attains a predetermined orientation relative to the direction of the force of gravity on the device, comprising:
a housing having at least two planar surfaces thereon and oriented at a predetermined angle relative to each other;
a source of electrical power received within said housing;
a first, electrically conductive member received within said housing and in electrical communication with said source of power;
a second member received within said housing in spaced apart relation to said first member, said second member having an electrically conductive surface on predetermined portions only;
a pendulum disposed between said first and second members, said pendulum having electrical contact means on opposite sides of same with electrical connections therebetween, said electrical contact means on one side of said pendulum making continuous electrical contact with said first electrically conductive member;
electrical signal means associated with said source of electrical power, said first member and one of said electrically conductive surface portions of said second member;
whereby when said housing is resting on one of said planar surfaces, said contact means in said opposite side of said pendulum electrically communicates with said electrically conductive surface at one of said predetermined portions of said second member, as gravitational forces acting on said pendulum locate said opposite side contact means at said predetermined electrically conducting surface portion of said second member; and
whereby when said housing is disposed to cause gravitational forces on said pendulum to locate said opposite side contact means of said pendulum at said electrically conductive surface of said second member, said electrical signal means, said source of electrical power, said first member, said electrical contact means of said pendulum, and said electrically conductive surface portion of said second member, are electrically connected to activate said signal means.

8. The device of claim 7, wherein:
said electrically conductive surface of said second member includes at least one razor thin foil portion of conducting material for providing precise electrical communication with said contact means on said opposite side of said pendulum.

* * * * *